United States Patent
Prasad

(10) Patent No.: US 9,187,661 B2
(45) Date of Patent: Nov. 17, 2015

(54) INK COMPOSITION

(75) Inventor: Keshava A. Prasad, San Marcos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 72 days.

(21) Appl. No.: 14/349,025

(22) PCT Filed: Oct. 4, 2011

(86) PCT No.: PCT/US2011/054760
§ 371 (c)(1),
(2), (4) Date: Apr. 1, 2014

(87) PCT Pub. No.: WO2013/052036
PCT Pub. Date: Apr. 11, 2013

(65) Prior Publication Data
US 2014/0247312 A1    Sep. 4, 2014

(51) Int. Cl.
*C09D 11/30* (2014.01)
*C09D 11/322* (2014.01)
*C09D 11/34* (2014.01)
*C09D 11/38* (2014.01)
*B41J 2/175* (2006.01)

(52) U.S. Cl.
CPC ............. *C09D 11/30* (2013.01); *B41J 2/17503* (2013.01); *C09D 11/322* (2013.01); *C09D 11/34* (2013.01); *C09D 11/38* (2013.01)

(58) Field of Classification Search
CPC ...... C09D 11/30; C09D 11/322; C09D 11/34; C09D 11/38

USPC ............... 347/100; 106/31.68; 524/58
See application file for complete search history.

(56) References Cited

U.S. PATENT DOCUMENTS

| | | | |
|---|---|---|---|
| 5,356,464 | A | 10/1994 | Hickman et al. |
| 5,384,334 | A | 1/1995 | Polovsky et al. |
| 6,171,702 | B1 | 1/2001 | Malhotra et al. |
| 2006/0003150 | A1 | 1/2006 | Braverman et al. |
| 2007/0225400 | A1 | 9/2007 | Schmid et al. |
| 2008/0118657 | A1 | 5/2008 | Taverizatshy et al. |
| 2010/0251933 | A1 | 10/2010 | Dodge et al. |
| 2010/0277526 | A1 | 11/2010 | Chen et al. |
| 2010/0277536 | A1 | 11/2010 | Funk et al. |

FOREIGN PATENT DOCUMENTS

| | | |
|---|---|---|
| CN | 101709184 | 5/2010 |
| EP | 0643113 | 3/1995 |
| EP | 1231246 | 8/2002 |
| JP | 2006249333 | 9/2006 |

(Continued)

OTHER PUBLICATIONS

Moore, MT., IBM TDB, "Ink Jet Ink", Jan. 1, 1983, 2 pages, http://ip.com/IPCOM/000045031.

*Primary Examiner* — Bruce H Hess
(74) *Attorney, Agent, or Firm* — Dierker & Associates, P.C.

(57) ABSTRACT

An ink composition includes from about 2 wt % to about 5 wt % of a colorant; from about 10 wt % to about 20 wt % of a co-solvent; from about 0.5 wt % to about 1.0 wt % of an alkyl phosphate ester; from about 0.5 wt % to about 9 wt % of any of methyl gluceth-10, methyl gluceth-20, PPG-10 methyl glucose ether, or PPG-20 methyl glucose ether; and a balance of water.

14 Claims, 2 Drawing Sheets

(56) References Cited

FOREIGN PATENT DOCUMENTS

| WO | WO 2009/068462 | 6/2009 |
| WO | WO 2011/078842 | 6/2011 |

INK COMPOSITION

BACKGROUND

The present disclosure relates generally to ink compositions.

Inkjet printing or recording systems are commonly used as an effective way to produce images on a print medium, such as paper. Generally, ink droplets are ejected from a nozzle at high speed by the inkjet recording system and onto the print medium to produce an image thereon. Thermal inkjet printing involves passing a pulse of current through a heating element, which causes a rapid vaporization of ink in a chamber to form a bubble. This results in a large pressure increase, which propels a droplet of ink onto the print medium. During the firing of a drop, a layer of ink covering the surface of the heating element can reach high temperatures, e.g., about 340° C. At this temperature, the ink may decompose and deposit residue on the surface of the heating element. This process is known as kogation. Kogation may deleteriously affect the volume, shape, and/or velocity of the ejected drop, which may cause the quality of the printed output to vary.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
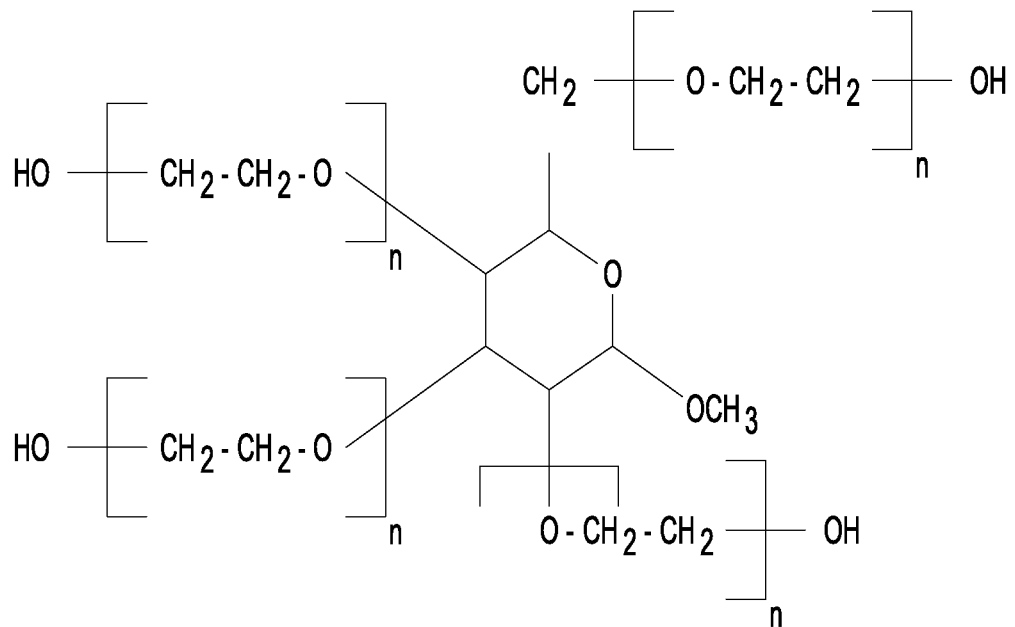
FIG. 1 is the core chemical structure of methyl gluceth-10 and methyl gluceth-20.

Examples of the ink composition disclosed herein include ethoxylated or propoxylated methyl glucoside derivatives, such as polyethylene glycol ethers of methyl glucose (e.g., methyl gluceth-10 and/or methyl gluceth-20, both of which are the INCI nomenclature), or polypropylene glycol ethers of methyl glucose (e.g., PPG-10 methyl glucose ether and/or PPG-20 methyl glucose ether, both of which are the INCI nomenclature). The use of these ethoxylated or propoxylated methyl glucoside derivatives, alone or in combination, in examples of the ink composition(s) disclosed herein advantageously helps the ink composition(s) to resist decomposition over the useful life of the print cartridge(s) from which the ink composition(s) is/are dispensed. As such, examples of the ink composition disclosed herein increase the print cartridge life, at least in part by slowing down or even preventing the rate of buildup of thermally decomposed (i.e., kogated) ink components on the surface of the heating element. Depending upon the ink cartridge that is utilized, the useful life of the print cartridge may be up to, and in some instances higher than, 1 billion drops per nozzle.

The amount of ethoxylated or propoxylated methyl glucoside derivatives may be selected in order to decrease kogation, or to decrease kogation and improve decap performance. The term "decap," as referred to herein, means the ability of the inkjet ink to readily eject from the print head, upon prolonged exposure to air. The decap time is measured as the amount of time that a print head may be left uncapped before the printer nozzles no longer fire properly, potentially because of clogging or plugging. Nozzle(s) may become clogged/plugged by a viscous plug that forms in the nozzle(s) as a result of water loss, crusting of the ink, and/or crystallization of the colorant in and/or around any of the nozzles. If a nozzle has plugged, ink droplets ejected through the nozzle's orifice may be misdirected, which may adversely affect print quality. The orifice may also become completely blocked, and as a result, the ink droplets may not pass through the affected nozzle. In some instances, it may be desirable to select the amount of ethoxylated or propoxylated methyl glucoside derivatives in order to strike a balance between desirable kogation and decap performance.

Examples of the ink composition disclosed herein include a colorant, a co-solvent, an alkyl phosphate ester, any of methyl gluceth-10, methyl gluceth-20, PPG-10 methyl glucose ether, or PPG-20 methyl glucose ether, and a balance of water.

The colorant may be any pigment dispersion having an acid number ranging from about 150 to about 200 and including a dispersing polymer with a molecular weight ranging from about 5000 to about 12000. In an example, the pigment dispersion is a magenta pigment, styrene acrylate dispersion, similar to, for example PR 122, PR 282, and PR150. Pigment dispersions of other colors, aside from magenta, are within the scope of the present disclosure as long as they have a dispersing polymer with the desirable molecular weight, and the desired acid number. In an example, the amount of colorant utilized in the ink composition ranges from about 2 wt % to about 5 wt % of the total wt % of the ink composition. In another example, the amount of colorant utilized in the ink composition ranges from about 2 wt % to about 4 wt % of the total wt % of the ink composition.

As mentioned above, examples of the ink composition include a co-solvent. The co-solvent selected depends, at least in part, upon the other components of the ink composition. Examples of suitable co-solvents include di-(2-hydroxyethyl)-5,5-dimethylhydantoin (commercially available as DANTOCOL® DHE from Lonza, Basel, Switzerland); 2-hydroxyethyl-2-pyrrollidinone; glycerol polyoxyethyl ether; tripropylene glycol; tetraethylene glycol; 1-(2-hydroxyethyl)-2-imidazolidinone; 1,2,6-hexanetriol; trimethylolpropane; glycerol; 2-hydroxyethyl-2-methyl-1,3-propanediol; or combinations thereof. In an example, the amount of co-solvent utilized in the ink composition ranges from about 10 wt % to about 20 wt % of the total wt % of the ink composition. In another example, the amount of co-solvent utilized in the ink composition ranges from about 10 wt % to about 15 wt % of the total wt % of the ink composition. When a combination of co-solvents is utilized, it is to be understood that the total amount of co-solvents present in the ink composition is 20 wt % or less.

Examples of the ink composition disclosed herein also include an alkyl phosphate ester, which is believed to contribute to the reduction or elimination of kogation. This component may be present in the ink composition in an amount ranging from about 0.5 wt % to about 1.0 wt % of the total wt % of the ink composition. Some examples of suitable alkyl phosphate esters include those that are commercially available from Croda, Inc., Edison, N.J., such as CRODAFOS™ O3A (formerly the CRODAFOS™ N3 product series).

Figure 2:
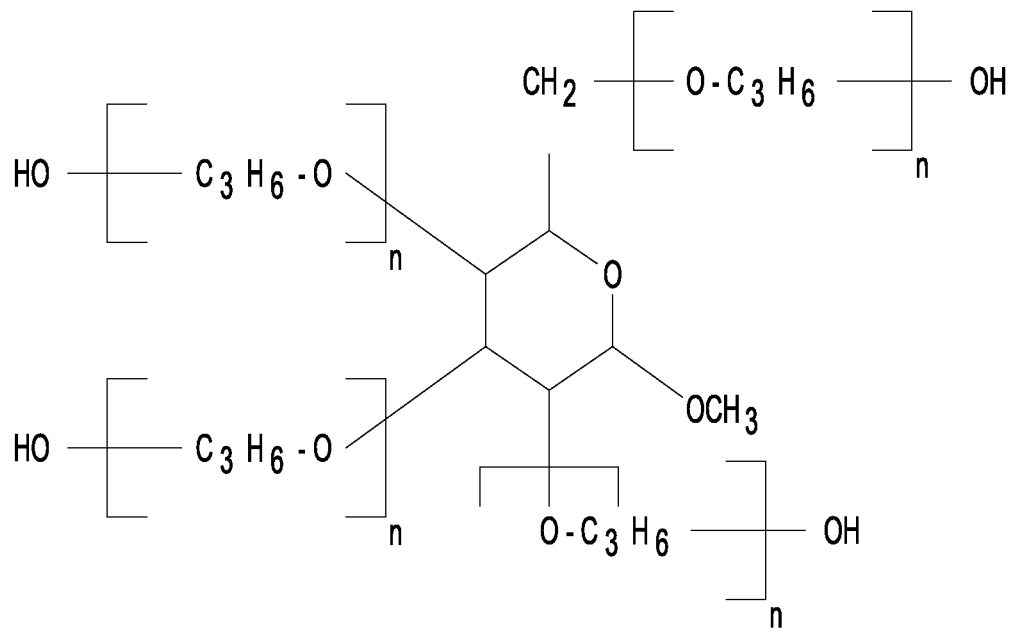
FIG. 2 is the core chemical structure of PPG-10 methyl glucose ether and PPG-20 methyl glucose ether.

The ink composition(s) disclosed herein also include methyl gluceth-10, methyl gluceth-20, PPG-10 methyl glucose ether, PPG-20 methyl glucose ether, or combinations thereof. FIG. 1 illustrates the base chemical structure of methyl gluceth-10 (commercially available as GLUCAM™ E-10 from Lubrizol Corp., Wickliffe, Ohio) and methyl gluceth-20 (commercially available as GLUCAM™ E-20 from Lubrizol Corp., Wickliffe, Ohio), which are ethoxylated methyl glucoside derivatives. For methyl gluceth-10, "n" ranges from 5-15, where the average "n" total is 10. The molecular weight of methyl gluceth-10 is about 680. For methyl gluceth-20, "n" ranges from 10-30, where the average "n" total is 20. The molecular weight of methyl gluceth-20 is about 1100. FIG. 2 illustrates the base chemical structure of PPG-10 methyl glucose ether (commercially available as GLUCAM™ P-10 from Lubrizol Corp., Wickliffe, Ohio) and PPG-20 methyl glucose ether (commercially available as GLUCAM™ P-20 from Lubrizol Corp., Wickliffe, Ohio), which are propoxylated methyl glucoside derivatives. For PPG-10 methyl glucose ether, "n" ranges from 5-15, where the average "n" total is 10. For PPG-20 methyl glucose ether, "n" ranges from 10-30, where the average "n" total is 20.

The methyl gluceth-10, methyl gluceth-20, PPG-10 methyl glucose ether, and/or PPG-20 methyl glucose ether is/are used in place of ethoxylated glycerol (e.g., LIPONIC™ EG-1, Lipo Chemicals, Inc., Paterson, N.J.). As will be shown in the Examples, it has been found that ethoxylated glycerol is not as effective in preventing kogation when compared to the example ink compositions disclosed herein. This is particularly true when the print cartridge useful life is equal to or greater than 350 million drops per nozzle fired. Furthermore, methyl gluceth-10, methyl gluceth-20, PPG-10 methyl glucose ether, and/or PPG-20 methyl glucose are believed to, at least in some instances, improve kogation without having a deleterious impact on decap performance. This is believed to be an advantage over using ethoxylated glycerol. As such, in the examples disclosed herein, the ink composition(s) exclude ethoxylated glycerol, and include instead methyl gluceth-10, methyl gluceth-20, PPG-10 methyl glucose ether, and/or PPG-20 methyl glucose.

The amount of methyl gluceth-10, methyl gluceth-20, PPG-10 methyl glucose ether, and/or PPG-20 methyl glucose used in the examples disclosed herein ranges from about 0.5 wt % to about 9 wt % of the total wt % of the ink composition. The higher amounts of methyl gluceth-10, methyl gluceth-20, PPG-10 methyl glucose ether, and/or PPG-20 methyl glucose within the given range are believed to perform better in terms of kogation reduction/elimination, however, it is also believed that when these component(s) is/are used in amounts over 9 wt %, the decap performance of the ink composition may be undesirable. When the methyl gluceth-10, methyl gluceth-20, PPG-10 methyl glucose ether, and/or PPG-20 methyl glucose is/are used in amounts over 9 wt %, decap may be deleteriously affected due, at least in part, to the much higher viscosity of the ink composition. The amount of methyl gluceth-10, methyl gluceth-20, PPG-10 methyl glucose ether, and/or PPG-20 methyl glucose used in the examples disclosed herein may be modified in order to obtain desirable kogation performance (e.g., using higher amounts—≥1.5 wt %—within the given range), desirable kogation and decap performance (e.g., using lower amounts—≤1.5 wt %—within the given range), or desirable kogation and optical density performance (e.g., using higher amounts within the given range). In an example ink composition, the amount of methyl gluceth-10 included ranges from about 0.5 wt % to about 1 wt %. In another example ink composition, the amount of methyl gluceth-20 included ranges from about 1 wt % to about 1.5 wt %.

The balance (up to 100 wt %) of the ink composition is made up of water.

For thermal inkjet printing, it may be desirable that the ink composition has a basic pH, ranging anywhere from greater than 7 to 14. When the initial pH of the resulting ink composition is acidic, neutral, or near-neutral basic (e.g., having a pH ranging from 7.1 to 8), it may be desirable to adjust the pH of the resulting ink composition to a basic or more basic pH. Any suitable base may be added to adjust the pH, as long as the added base does not interfere with the other desirable properties of the ink composition. Examples of suitable bases include NaOH or KOH. The amount of base added will depend, at least in part, on the initial pH of the ink composition and the desired final pH of the ink composition. In an example, the pH is adjusted to about 9, and a suitable amount of base is added until this pH is obtained. When adding the base to the ink composition, the pH may be tested in order to determine if the desired pH has been obtained.

In some instances, other additives may be added to the ink composition, including a non-ionic surfactant, a biocide, a polyurethane binder, and combinations thereof.

When a non-ionic surfactant is utilized, a suitable amount of the non-ionic surfactant may range from about 0.5 wt % to about 2 wt %. Examples of suitable non-ionic surfactants include those based upon acetylenic diol chemistry (e.g., SURFYNOL® SE-F and SURFYNOL® 440, available from Air Products and Chemicals, Inc., Allentown, Pa.) and secondary alcohol ethoxylates (e.g., TERGITOL™ 15-S-7 and TERGITOL™ 15-S-9m available from The Dow Chemical Co., Midland, Mich.).

When a biocide is utilized, a suitable amount of the binder may range from about 0.05 wt % to about 0.5 wt %. It is to be understood that the upper limit for the biocide(s) may depend upon the type of biocide and its toxicological effect and/or regulatory requirements. For example, the upper limit for PROXEL™ GXL (Arch Chemicals, Inc., Norwalk, Conn.) is 0.2 wt %. Suitable biocides include, for example, PROXEL™ GXL, KORDEK™ MLX (The Dow Chemical Co.), and/or BIOBAN™ CS-1246 (The Dow Chemical Co.).

When a polyurethane binder is utilized, a suitable amount of the binder may range from about 0.5 wt % to about 3 wt %. In the examples disclosed herein, the polyurethane binder has an acid number ranging from 50 to 59, and a molecular weight ranging from about 20000 to about 50000. In an example, the polyurethane binder has an acid number of 55 and a molecular weight of about 42000. It is to be understood that the co-solvent used and amount of co-solvent used may depend, at least in part, upon whether the polyurethane binder is included in the ink composition. As an example, the co-solvent may be selected in order to aid in dispersing the polyurethane binder throughout the ink composition. As another example, the amount of polyurethane binder used may have a deleterious effect on the decap performance, and the co-solvent(s) may be selected to counteract this deleterious effect. In an example that includes the polyurethane binder, two co-solvents may be used, such as di-(2-hydroxyethyl)-5,5-dimethylhydantoin and 2-hydroxyethyl-2-pyrrolidinone.

Figure 3:
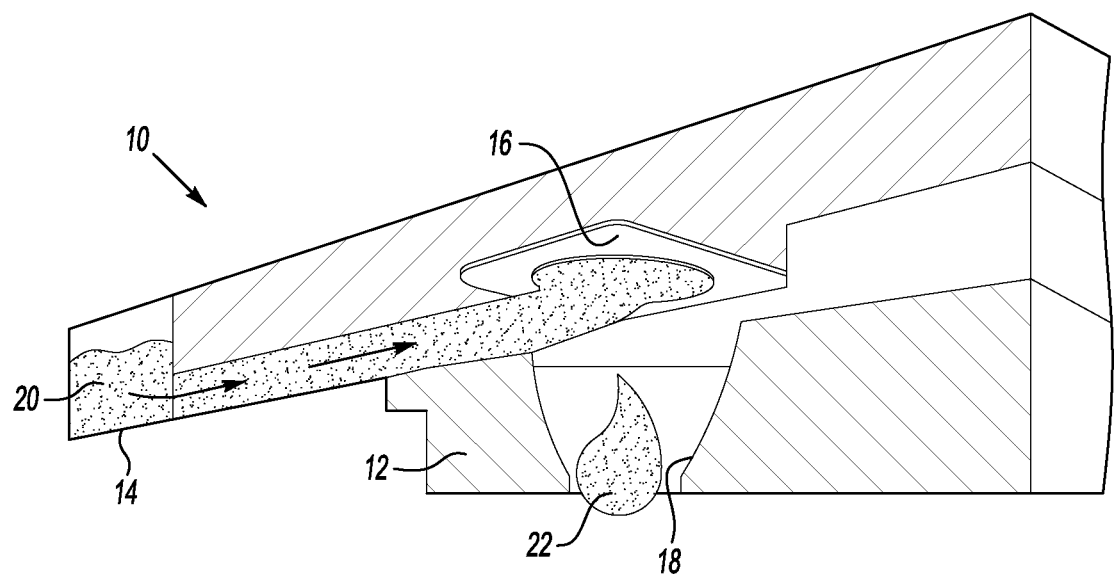
FIG. 3 is a cut-away, perspective semi-schematic illustration of an example of an ink cartridge including an example of the ink composition disclosed herein.

The ink composition(s) disclosed herein may be suitable for use in high speed printing. In an example, the ink composition(s) may be used in web press printers that print more than 2 meters per second. A cut-away perspective semi-schematic view of a print cartridge 10 that may be used in a web press printer is shown, for example, in FIG. 3. The print cartridge 10 includes a housing 12 (which may include one or more layers of different materials) that is operatively connected to a reservoir 14 that contains an example of the ink composition 20 disclosed herein. A fluid path connects the reservoir 14 to a fluid ejector 16. In a thermal inkjet print cartridge 10, the fluid ejector 16 is a heating element that creates heat to vaporize the ink composition 20, which creates a bubble that expands to push the ink composition 20 (in the form of drops 22) out of a nozzle 18 that is aligned with the fluid ejector 16. While a single fluid ejector 16 and nozzle 18 is shown, it is to be understood that a single print cartridge 10 may include multiple (e.g., 400 or some other desirable number) fluid ejectors 16 and nozzles 18. While not shown, it is to be understood that the print cartridge 10 includes an integrated circuit that routes signals (e.g., from a processor that is capable of running suitable computer readable instructions) to the desirable fluid ejector(s) 16 and nozzle(s) 18 for firing ink drops therefrom to produce images on a desirable medium.

When used with high speed printers, the ink composition(s) disclosed herein provide substantially consistent print quality (i.e., ≤15% change in drop velocity and/or drop weight, and in some instances ≤10% change in drop velocity and/or drop weight) over the life of the print cartridge 10. The ink composition(s) disclosed herein may also maintain suitable decap performance in high speed printers, where the number of spits per nozzle at a given frequency maintains nozzle health of idle nozzles during printing.

When molecular weights are specified herein, it is to be understood that the molecular weights are weight average molecular weights.

To further illustrate the present disclosure, examples are given herein. It is to be understood that these examples are provided for illustrative purposes and are not to be construed as limiting the scope of the disclosed example(s).

EXAMPLE 1

Inks were prepared with ethoxylated methyl glucoside derivatives, namely methyl gluceth-10 or methyl gluceth-20. A comparative ink was prepared with LIPONIC™ EG-1 (Lipo Chemicals, Inc., Paterson, N.J.) instead of methyl gluceth-10 or methyl gluceth-20. The compositions of the sample inks and the comparative ink are shown in Table 1. As depicted, samples 1-4 included 0.50 wt %, 1.00 wt %, or 1.50 wt % of methyl gluceth-20, and samples 5 and 6 respectively included 0.50 wt % and 1.00 wt % of methyl gluceth-10. The comparative sample (i.e., comp. sample) contained no methyl gluceth-10 or methyl gluceth-20, but rather included LIPONIC™ EG-1.

TABLE 1

Ink Formulations

| Component | Comp. Sample Wt % | Sample 1 Wt % | Sample 2 Wt % | Sample 3 Wt % | Sample 4 Wt % | Sample 5 Wt % | Sample 6 Wt % |
|---|---|---|---|---|---|---|---|
| di-(2-hydroxyethyl)-5,5-dimethylhydantoin | 8.00 | 8.00 | 8.00 | 8.00 | 8.00 | 8.00 | 8.00 |
| 2-hydroxyethyl-2-pyrrollidinone | 1.50 | 1.50 | 1.50 | 1.50 | 1.50 | 1.50 | 1.50 |
| methyl gluceth-20 | None | 0.50 | 1.00 | 1.00 | 1.50 | None | None |
| methyl gluceth-10 | None | None | None | None | None | 0.50 | 1.00 |
| LIPONIC ™ EG-1 (Lipo Chemicals, Inc.) | 0.50 | None | None | None | None | None | None |
| CRODAFOS ™ N3 (Croda, Inc.) | 0.75 | 0.75 | 0.75 | 0.75 | 0.75 | 0.75 | 0.75 |
| SURFYNOL ® SE-F (Air Products and Chemicals, Inc.) | 0.65 | 0.65 | 0.65 | 0.65 | 0.65 | 0.65 | 0.65 |
| Polyurethane binder | 0.75 | 0.75 | 0.75 | 0.75 | 0.75 | 0.75 | 0.75 |
| PROXEL ™ GXL (The Dow Chemical Co.) | 0.18 | 0.18 | 0.18 | 0.18 | 0.18 | 0.18 | 0.18 |
| KORDEK ™ MLX (The Dow Chemical Co.) | 0.14 | 0.14 | 0.14 | 0.14 | 0.14 | 0.14 | 0.14 |
| Magenta Pigment Styrene Acrylate Dispersion | 3.50 | 3.50 | 3.50 | 3.50 | 3.50 | 3.50 | 3.50 |
| Water | Balance to 100 wt % | Balance to 100 wt % | Balance to 100 wt % | Balance to 100 wt % | Balance to 100 wt % | Balance to 100 wt % | Balance to 100 wt % |

Each of the comparative sample and samples 1-6 were filled into a thermal inkjet pen/cartridge (Hewlett Packard A3015 hybrid pens), and were continuously fired on a pen/cartridge life test apparatus for the life of the pen/cartridge. For this test, no media is used. Rather, the pen/cartridge life test apparatus exercises the pen/cartridge, and the ink drops are ejected into a spittoon. At certain intervals and at the end of the pen/cartridge life (over 700 million drops per nozzle), the pen/cartridge drop velocity and drop weight were monitored. Table 2 illustrates the % change in drop velocity at the end of the pen/cartridge life both in the ambient at the end of the test and after 1 week at 60° C. and in a non-ambient environment. Table 3 illustrates the % change in drop weight at the end of the pen/cartridge life both in the ambient at the end of the test and after 1 week at 60° C. and in a non-ambient environment.

TABLE 2

% Change in Drop Velocity

| Formulation | Initial Velocity (m/s) | Ambient % Change @ life | 1 week 60° C. % Change @ life |
|---|---|---|---|
| Comp. Sample | 12.8 | −24.2 | No data |
| Sample 1 | 14.4 | −14.9 | No data |
| Sample 2 | 14.5 | −7.6 | No data |
| Sample 3 | 13.1 | −5.7 | −8.7 |
| Sample 4 | 12.7 | −5.9 | −7.2 |
| Sample 5 | 12.7 | −5.2 | −12.7 |
| Sample 6 | 12.7 | −5.7 | −12.9 |

TABLE 3

% Change in Drop Weight

| Formulation | Initial Weight (ng) | Ambient % Change @ life | 1 week 60° C. % Change @ life |
|---|---|---|---|
| Comp. Sample | 6.8 | −13.5 | No data |
| Sample 1 | 7.1 | −11.9 | No data |
| Sample 2 | 6.7 | −7.5 | No data |
| Sample 3 | 6.6 | −3.7 | −5.7 |
| Sample 4 | 6.7 | −3.8 | −4.2 |
| Sample 5 | 6.7 | −3.5 | −8.1 |
| Sample 6 | 6.7 | −3.6 | −11.0 |

To obtain consistent print quality over the life of the pen/cartridge, it is desirable to have a % change in drop velocity and a % change in drop weight each be equal to or less than 10% (in either the positive or negative direction). However, a % change in drop velocity and a % change in drop weight that are each between 10% and 15% are acceptable, and may result in consistent print quality. An ink that results in a % change in drop velocity or a % change in drop weight that is over 15% is deemed unacceptable (even if the other % change is less than 15%).

Based upon the drop velocity data and the drop weight data taken immediately after the test is performed, samples 1-6 (containing, respectively, 0.50 wt % methyl gluceth-20, 1.00 wt % methyl gluceth-20, 1.00 wt % methyl gluceth-20, 1.50 wt % methyl gluceth-20, 0.50 wt % methyl gluceth-10, and 1.00 wt % methyl gluceth-10) are acceptable and effectively reduce kogation. Samples 2-6 each exhibits the desirable equal to or less than 10% change in both drop velocity and drop weight. As such, it may be desirable to use 0.50 wt % or more of methyl gluceth-10 and 1.00 wt % or more of methyl gluceth-20. The same data collected for the comparative sample indicates that the comparative sample is unacceptable. After 1 week at 60° C. and in a non-ambient environment, samples 5 and 6 show acceptable results, but outside the desired 10% change. Overall, the data illustrates that methyl gluceth-10 or methyl gluceth-20 is suitable for reducing kogation over the life of the pen/cartridge, and is more effective than ethoxylated glycerol.

EXAMPLE 2

Prints were generated using the comparative sample ink and sample inks 2-6 in Example 1, and these prints were tested for optical density twice. The prints were generated using a Hewlett Packard CM8050 Edgeline printer modified to print with a 1 inch print cartridge. The inks were printed on plain paper with a fixer coated thereon. Optical density was measured with a densitometer. The following data is the average optical density data for the two tests.

TABLE 4

Average Optical Density (OD)

| Formulation | Ave OD |
|---|---|
| Comp. Sample | 1.10 |
| Sample 2 | 1.21 |
| Sample 3 | 1.20 |
| Sample 4 | 1.17 |
| Sample 5 | 1.22 |
| Sample 6 | 1.27 |

The average optical density test results indicate that the optical density of the prints formed using sample inks 2-6 was enhanced compared to the optical density of the print formed with the comparative sample ink.

EXAMPLE 3

Decap performance was also tested for sample inks 2-6 and the comparative sample ink of Example 1 using the Hewlett Packard CM8050 Edgeline printer modified to print with a 1 inch print cartridge. To test decap, the print cartridge is left out of the capping station for a known period of time. At the end of the time interval, the pen is printed to evaluate the nozzle health. The data indicated that the decap performance of inks including methyl gluceth-10 or methyl gluceth-20 was equal to or better than the decap performance of the comparative sample ink prepared with LIPONIC™ EG-1. More particularly, sample inks 2, 3, 5 and 6 exhibited better decap performance than the comparative sample ink, and sample 4 exhibited similar decap performance to the comparative sample ink. These results illustrate that the amount of methyl gluceth-10 or methyl gluceth-20 (or PPG-10 methyl glucose ether, or PPG-20 methyl glucose ether) may be adjusted in order to obtain reduced kogation and enhanced decap performance.

It is to be understood that the ranges provided herein include the stated range and any value or sub-range within the stated range. For example, a range from about 0.5 wt % to about 9 wt % should be interpreted to include not only the explicitly recited limits of about 0.5 wt % to about 9 wt %, but also to include individual values, such as 0.6 wt %, 0.75 wt %, 5 wt %, etc., and sub-ranges, such as from about 1.5 wt % to about 8 wt %, from about 0.5 wt % to about 1 wt %, etc. Furthermore, when "about" is utilized to describe a value, this is meant to encompass minor variations (up to +/−5%) from the stated value.

While several examples have been described in detail, it will be apparent to those skilled in the art that the disclosed examples may be modified. Therefore, the foregoing description is to be considered non-limiting.

What is claimed is:

1. An ink composition, comprising:
   from about 2 wt % to about 5 wt % of a colorant;
   from about 10 wt % to about 20 wt % of a co-solvent;
   from about 0.5 wt % to about 1.0 wt % of an alkyl phosphate ester;
   from about 0.5 wt % to about 9 wt % of any of methyl gluceth-10, methyl gluceth-20, PPG-10 methyl glucose ether, or PPG-20 methyl glucose ether; and
   a balance of water.

2. The ink composition as defined in claim 1, excluding ethoxylated glycerol.

3. The ink composition as defined in claim 1 wherein the ink composition includes from about 0.5 wt % to about 1.0 wt % of methyl gluceth-10.

4. The ink composition as defined in claim 1 wherein the ink composition includes about 1.0 wt % of methyl gluceth-20.

5. The ink composition as defined in claim 1 wherein a pH of the ink composition is about 9.0.

6. The ink composition as defined in claim 1 wherein the colorant is a magenta pigment dispersion having an acid number ranging from about 150 to about 200 and including a dispersing polymer with a weight average molecular weight ranging from about 5000 to about 12000.

7. The ink composition as defined in claim 1 wherein the co-solvent includes di-(2-hydroxyethyl)-5,5-dimethylhydantoin; 2-hydroxyethyl-2-pyrrollidinone; glycerol polyoxyethyl ether; tripropylene glycol; tetraethylene glycol; 1-(2-hydroxyethyl)-2-imidazolidinone; 1,2,6-hexanetriol;

trimethylolpropane; glycerol; 2-hydroxyethyl-2-methyl-1,3-propanediol; or combinations thereof.

8. The ink composition as defined in claim 1, further comprising an additive chosen from a non-ionic surfactant, a biocide, a polyurethane binder, and combinations thereof.

9. An ink cartridge, comprising:
a fluid reservoir;
a fluid ejector in fluid communication with the fluid reservoir; and
an ink composition present in the fluid reservoir, the ink composition including:
from about 2 wt % to about 5 wt % of a colorant;
from about 10 wt % to about 20 wt % of a co-solvent;
from about 0.5 wt % to about 1.0 wt % of an alkyl phosphate ester;
from about 0.5 wt % to about 9 wt % of any of methyl gluceth-10, methyl gluceth-20, PPG-10 methyl glucose ether, or PPG-20 methyl glucose ether; and
a balance of water.

10. The ink cartridge as defined in claim 9 wherein the ink composition excludes ethoxylated glycerol.

11. The ink cartridge as defined in claim 9 wherein the ink composition includes from about 0.5 wt % to about 1.5 wt % of methyl gluceth-10 or methyl gluceth-20.

12. The ink cartridge as defined in claim 9 wherein a pH of the ink composition is about 9.0.

13. The ink cartridge as defined in claim 9 wherein the colorant is a magenta pigment dispersion having an acid number ranging from about 150 to about 200 and including a dispersing polymer with a weight average molecular weight ranging from about 5000 to about 12000.

14. The ink cartridge as defined in claim 9 wherein the co-solvent includes di-(2-hydroxyethyl)-5,5-dimethylhydantoin; 2-hydroxyethyl-2-pyrrollidinone; glycerol polyoxyethyl ether; tripropylene glycol; tetraethylene glycol; 1-(2-hydroxyethyl)-2-imidazolidinone; 1,2,6-hexanetriol; trimethylolpropane; glycerol; 2-hydroxyethyl-2-methyl-1,3-propanediol; or combinations thereof.

* * * * *